United States Patent [19]

Pohl

[11] Patent Number: 4,522,075

[45] Date of Patent: Jun. 11, 1985

[54] TORQUE WRENCH

[76] Inventor: Peter Pohl, Eichenstrasse, D 4006 Erkrath 2, Fed. Rep. of Germany

[21] Appl. No.: 517,074

[22] Filed: Jul. 25, 1983

[30] Foreign Application Priority Data

Jul. 28, 1982 [DE] Fed. Rep. of Germany ....... 3228086

[51] Int. Cl.³ ............................................. B25B 23/142
[52] U.S. Cl. ............................... 73/862.23; 73/862.26; 73/862.35
[58] Field of Search ........... 73/862.21, 862.22, 862.23, 73/862.26, 862.35, 862.67

[56] References Cited

U.S. PATENT DOCUMENTS 4,006,629  2/1977  Barrett et al. .................... 73/862.26
4,366,874  1/1983  Pidoux et al. .................... 73/862.67

FOREIGN PATENT DOCUMENTS 553489  6/1977  U.S.S.R. ........................... 73/862.67

OTHER PUBLICATIONS

The Strain Gage Primer—McGraw-Hill Book Co., 2nd ed., Perry & Lissner, pp. 230-232.

Primary Examiner—Charles A. Ruehl
Attorney, Agent, or Firm—Georges A. Maxwell

[57] ABSTRACT

A torque wrench including an elongate deflection beam section. Two strain gauges are attached to the beam in longitudinal spaced relationship from the ends thereof and relative to each other. Each strain gauge is connected in a related cyclically energized measuring bridge, the output voltage of which is amplified and, under control of a switch, is conducted to and stored in a related measured value memory. The two stored measured value voltages are cyclically and alternatingly conducted to a micro-processor by means of an analog-to-digital converter. The micro-processor compares the measured value voltages and conducts a resulting signal to an indicating instrument which displays the resulting signal in force units.

19 Claims, 3 Drawing Figures

TORQUE WRENCH

This invention has to do with torque wrenches and is particularly concerned with a torque wrench having novel electronic means for measuring and indicating applied forces.

BACKGROUND OF THE INVENTION

Torque wrenches of the class here concerned with are provided to apply measured predetermined torque or bias forces onto and through various screw fastening means, such as headed screw fasteners engaged in work pieces. Such wrenches characteristically include elongate lever arms with fastener engaging means or points of engagement at one of their ends and manually engageable handles at their other ends. Further, the class of torque wrenches here concerned with is further characterized by the inclusion or provision of elongate, elastic, deflection beam portions or sections extending longitudinally of the lever arms, between the ends thereof and which bend under the work forces applied to and conducted through the wrenches and by means which measure the deflection of the beams and which translate and display the measured deflection of the beams, by means of indicating instruments, in suitable force units.

In most torque wrenches of the class here concerned with, the means for measuring deflection of the deflection beams and the indicating instruments have been mechanical means and instruments.

The number of such wrenches incuding electrical or electronic means for measuring deflection of the deflection beams and related electrical or electronic indicating instrument, such as my invention includes, is limited.

The most pertinent prior art that I am aware of is that torque wrench which is described in U.S. Pat. No. 4,006,629. That patented wrench structure has or is provided with four strain gauges attached to the deflection beam, there being two strain gauges attached to one side and two strain gauges attached to the opposite or other side of the beam. The pairs of strain gauges at the opposite sides of the deflection beam are spaced differently longitudinally of the beam and from the fastener engaging means or point of engagement of the wrench structure. The four strain gauges establish the four resistors of a Wheatstone bridge, the output voltage of which is representative of the deflection of the beam and of the torsional force applied by the wrench onto a related fastener or the like. As long as there is no load or force applied through the wrench, the output voltage of the bridge is zero. Changes in the length of the beam resulting from thermal expansion and contraction act symmetrically on the four gauges, precluding a change in the voltage output of the bridge. When the wrench is used and the beam bends, the pair of strain gauges at one side of the beam are stretched or lengthened and the pair of gauges at the other or opposite side of the beam are compressed or shortened. Lengthening and shortening of the gauges in the above manner changes their resistance and an output voltage of the bridge is obtained which deviates from zero. That output voltagg is supplied to an indicating instrument for digital display of the measured value by means of a corresponding converter.

The foregoing prior art wrench requires a constant power supply to the bridge, converter and indicating instrument whereby power consumption is so high that an outside power supply must be provided. A self contained high capacity battery power supply capable of sustaining operation of the noted wrench structure would be excessively large and heavy for practical use of that wrench structure.

A further disadvantage of the noted prior art wrench resides in the fact that balancing and adjustment of the wrench is not possible subsequent to attachment of the strain gauges to the deflection beam and the finished dimensions of the beam and of the gauges involve tolerances. Also, attachment and positioning of the gauges on the beam involves tolerances. Deviations in the wrench structure due to such tolerances are cumulative and cause errors in measurement which cannot be balanced or otherwise compensated for. Still further, the finished dimensions of the strain gauges (involving tolerances) have associated therewith the proportionality factor K indicative of the ratio of change in length to corresponding change in resistance.

OBJECTS AND FEATURES OF MY INVENTION

It is an object of this invention to provide an improved torque wrench structure of the same general type and/or class referred to above in which the several shortcomings and/or disadvantages noted to exist in such torque wrenches provided by the prior art are avoided.

Another object of my invention is to provide a wrench of the class notedabove which includes low-priced and simple means for accurate measurement and indicating of torque at low power consumption, while also providing increased applicability and adjustment.

The objects are attained by providing and attaching two independent strain gauges to a side of the elongate deflection beam, portion or section of a related torque wrench structure, in spaced longitudinal relationship from and between the ends of the beam and relative to each other, connecting each gauge as a resistance in a related measuring bridge, amplifying the output voltage of each bridge and, by means of suitable related switches, conducting and storing the amplified voltages is related measured value memories. Next, by suitable switching means, cyclically and alternatingly conducting the stored measured value voltages into an analog-to-digital converter and thence into a micro-processor for interconnection, comparing and processing for indication of the actual amount of force applied onto and through the deflection beam by an indicating instrument connected with and receiving a resulting output signal from the micro-processor.

The two measuring bridges are controlled by electric current delivered thereto by transistors which are triggered by signals from the micro-processor and are cyclically energized for periods of from 15 to 200 microseconds. Actual measuring of forces (beam deflection) is therefore effected intermittently for very short periods of time and little power is required and/or consumed.

When the wrench that I provide is used, the cyclic sequence of the measurements can increase upon display of the rapidly changing measured value, controlled by the micro-processor. Therefore, the measuring periods can be varied, and they adapt themselves automatically to requirements. As long as the measured value remains constant, only a few measurements per unit of time will be carried out, whereas, when differing measured values are received, the number of measurements per unit of time will be increased. This also reduces the power consumption, as most of the measurements are only carried out, when the torque wrench is actually applying force to a fastener or the like. Then too, actual measurement is quite temporary.

For a zero torque measurement, the two measuring bridges can have an output voltage corresponding to half of the maximum voltage processed by the AD-converter, whereby torque measurement in one direction of rotation of the wrench covers voltage values between say ½ and 1/1 and torque measurement in the other direction or rotation of the wrench covers voltage values between say ½ and 0. Thereby, positive and negative torques can be displayed in simple manner by the indicating instrument.

The maximum voltage being processed by the AD-converter may be approximately 2.5 volts. This voltage is sufficient to carry out an appropriate measurement. When measuring a zero torque, the output voltage at the measuring bridges will be approximately 1.25 volts.

Upon a zero torque measurement, the actual value of the output voltages of the measuring bridges can be compared with the nominal value and deviations during actual measurement of positive or negative torques can be used as correction values in the micro-processor. Thus, a zero correction is effected in simple manner, as when the strain gauges are lengthened or compressed as a result of thermal expansion and contraction.

The measured values of series of measurements are interconnected in the micro-processor and the mean value of the series of measurements is displayed upon interrogation. Therefore, the micro-processor is effective to compile series of measurements in a particularly simple manner, the individually measured values being compared with each other, and a mean value displayed upon interrogation.

The measured values of series of measurements is also interconnected in the micro-processor and the maximum value of the series of measurements is displayed upon interrogation. Here too, the measured values are compared with each other in simple manner, and the maximum value is displayed upon interrogation.

Reaching a nominal value to be adjusted and provided with plus and minus tolerances, of the torque to be applied, can be displayed optically and/or acoustically. An optical and/or acoustic signal demonstrates to the user that the adjusted tolerance range is reached.

Advantageously, interconnection of the measured values in the micro-processor is such that only the actual values within the tolerance range are processed.

If the maximum value of the torque to be applied is exceeded, reverse rotation of the wrench removes the inadmissibly high measured value from the measured value interconnection and allows for desired determination of the maximum value and/or mean value of a series of measurements. When exceeding the maximum value to be adjusted, of the torque to be applied, the user must release the inadmissibly high work force exerted in and through the wrench. By rotation of the torque wrench in reverse direction, the excessively high measured value is cancelled from the measured value interconnection and has no influence on the determination of the mean value of a series of measurements.

The voltages applied to the measuring bridges are controlled by the micro-processor. Thus, the measuring range of the bridges can be varied. Therefore, the micro-processor is effective to change the measuring range of the torque wrench in simple manner.

Amplification of the output voltages of the measuring bridges is controlled by the micro-processor. Thus, by changing the amplification of the output voltages the measuring range can be adjusted or changed in simple manner.

With the micro-processor also a conversion and switching to different units of measure can be carried out. By conversion, therefore, the units of measure meterkilogram, Newtonmeter, etc. can be used.

The foregoing objects and features of the invention will be fully understood from the following description of the invention throughout which reference is made to the accompanying drawings.

DESCRIPTION OF THE INVENTION

Figure 1:
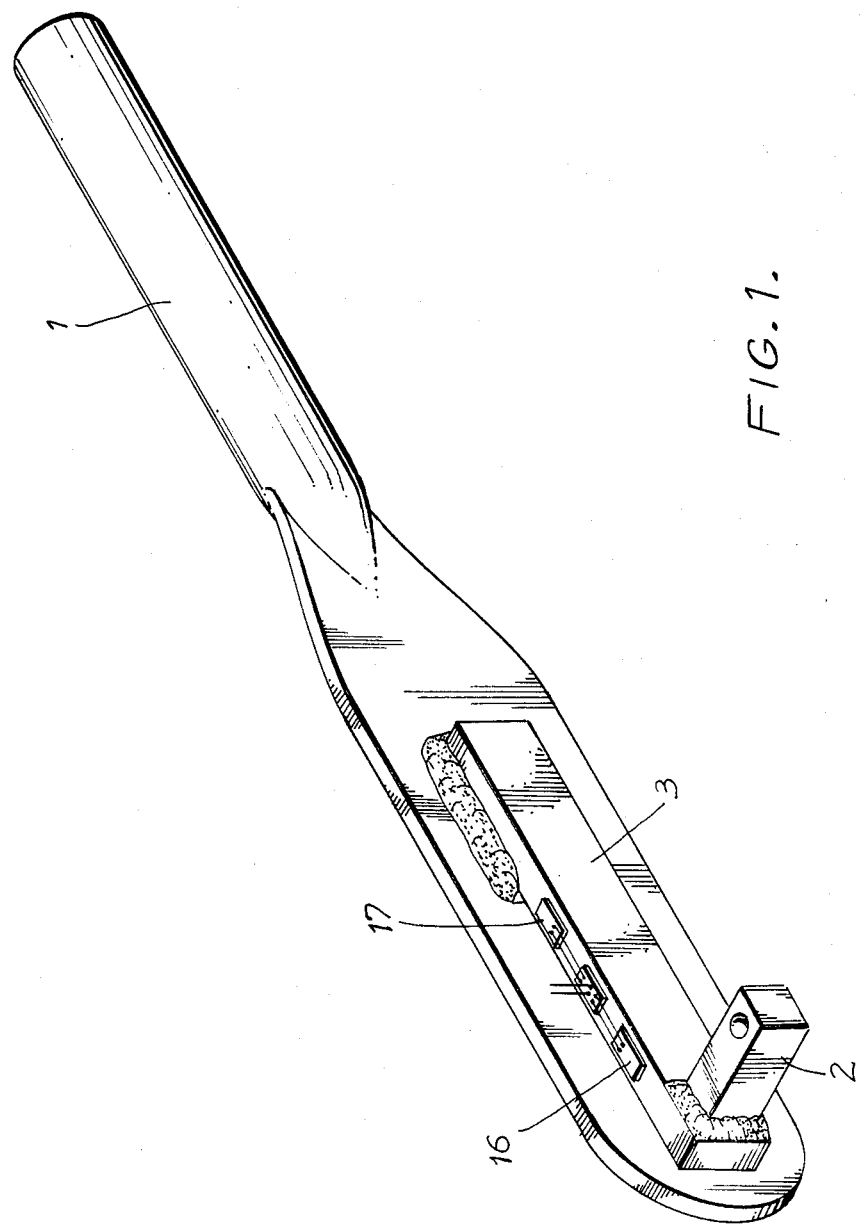
FIG. 1 is a perspective view of a torque wrench embodying the invention.

The torque wrench illustrated in FIG. 1 serves for application and/or measurement of preset bias or torsional forces exerted by the wrench structure onto and through screw fasteners engaged in work pieces. For reasons of simplicity, the work pieces and screw fasteners are not shown. The torque wrench comprises an elongate lever arm in the form of or defining a deflection beam 3. At one end of the deflection beam 3, there is a point of engagement in the form of a square 2. In accordance with common practice, the square 2 or point of engagement is an elongate polygonal drive member fixed to one end of the deflection beam with its axis normal to the axis of the beam and with which a fastener engaging socket or the like can be drivingly engaged. At the other end of the deflection beam 3, there is provided an elongate manually engageable handle 1. In the illustrated embodiment of the invention, the handle 1 is a flat metal part attached to its related end of the deflection beam 3 by welding. The handle, as shown, establishes an extension on the deflection beam 3.

The deflection beam 3 has attached thereto two strain gauges 16 and 17. The strain gauges 16 and 17 are positioned and attached to a side of the beam 3 which is lengthened or compressed during proper and intended use of the torque wrench. The two strain gauges 16 and 17 are spaced apart from each other in a longitudinal direction relative to the axis of the deflection beam 3. As diagrammatically indicated in FIG. 2, the strain gauge 16 is spaced a distance 11 from the point of engagement of the beam (the longitudinal axis of the square 2). The strain gauge 17 is spaced a distance 12 from the strain gauge 16. For reasons still to be explained, the spacings are expediently dimensioned such that 11 equals 12.

The lengthening and compression of the outer fiber of the deflection beam 3, as measured by the strain gauges 16 and 17, is proportional to the flexure of the beam and that flexure is dependent on the applied torque, the elasticity module and the moment of inertia. Since, when applying a force to the handle of a torque wrench, the lever arm, the elasticity module and the moment of inertia remain unchanged, the torque achieved can therefore be measured by the flexure.

When, for example, using the single strain gauge 16, the torque of the torque wrench corresponds to the product of torque measured with the strain gauge 16, M1 and 1/(1−11); 1 being the overall length of the lever arm to the point of application of the force and 11 being the distance between the strain gauge used and the pivot point of the torque wrench. As the distance between the pivot point of the torque wrench and the active force influences the accuracy of measurement, it is necessary to have the force applied to the same point of the handle for which a calibration had been made. The foregoing disadvantages are avoided by the use of the second strain gauge 17 spaced from the first strain gauge 16 at a distance 12 and interconnecting (comparing) the value measured at strain gauge 17 with the measured value of the first strain gauge 16.

Figure 2:
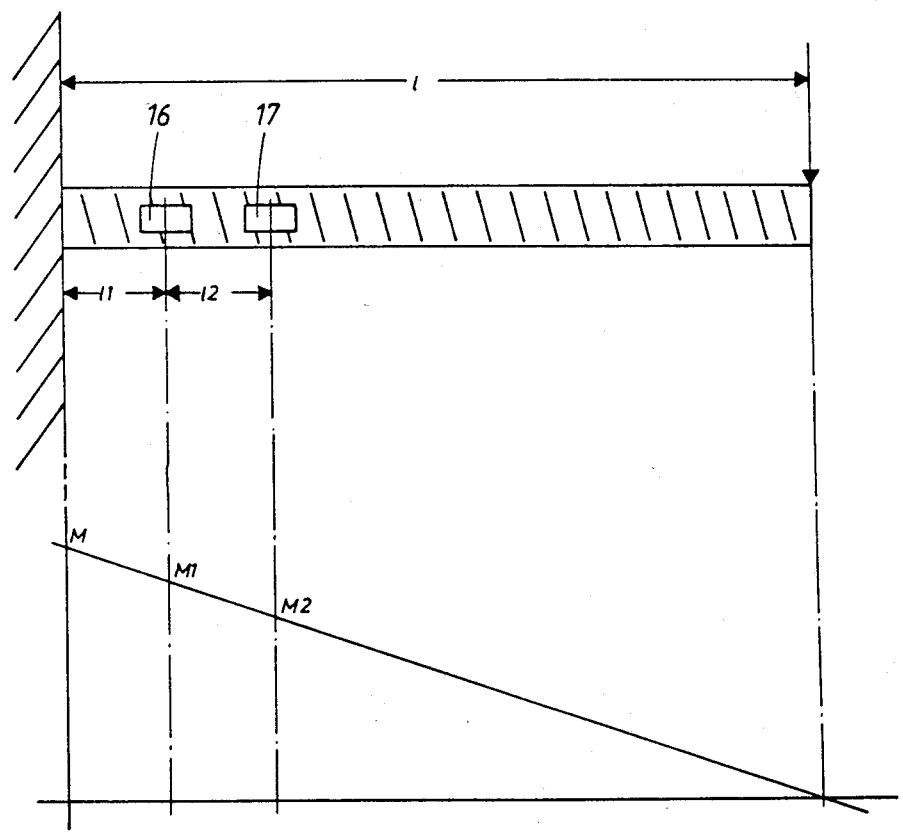
FIG. 2 is a schematic illustration of the deflection beam of the torque wrench and a diagram of the torque.

FIG. 2 illustrates the torque pattern relative to unilaterally clamped deflection beam. The torques determined by the two strain gauges 16 and 17 are referenced 16 and 17. The strain gauge 16 is spaced from the clamping point (square 2) at a distance 11, the strain gauge 17 at a distance 11+12 from the clamping point. Then, for the torque at the clamping point M=M1+(11/12) (M1−M2). In the specific case where 11=12, then M=2 M1−M2. Thus, the torque at the clamping point can be determined independently of the point of application of the force.

Figure 3:
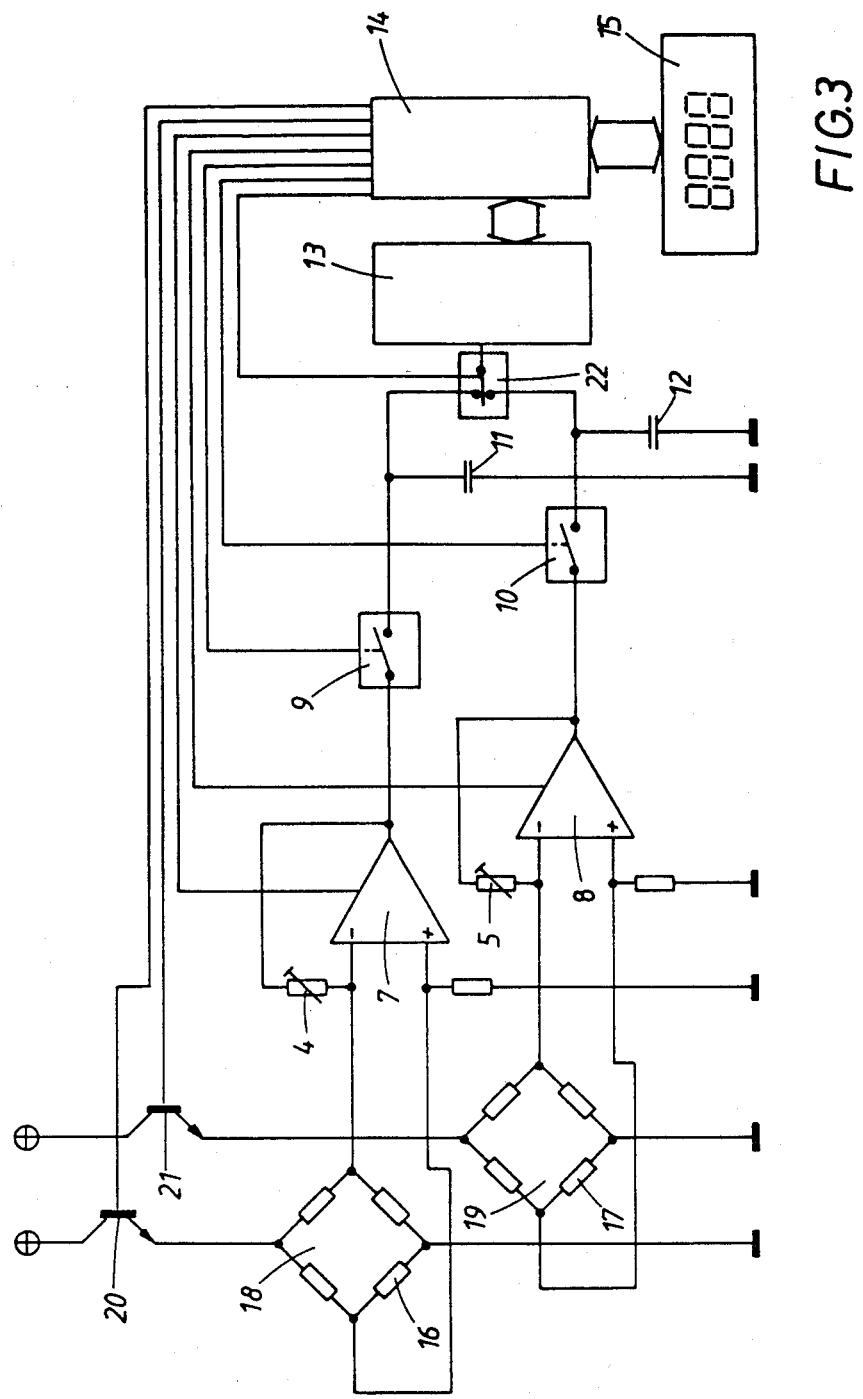
FIG. 3 is a circuit diagram of the torque wrench.

FIG. 3 illustrates the circuit diagram. The strain gauge 16 is connected as resistor in a measuring bridge 18 together with three other resistors. The strain gauge 17 is connected as resistor in a second measuring bridge 19 together with three other resistors. Hence, the two strain gauges 16 and 17 are connected independently of each other in their related measuring bridges 18 and 19. The output voltage of the measuring bridge 18 leads to an amplifier 7, while the output voltage of the measuring bridge 19 leads to an amplifier 8. The amplifier 7 can be controlled by a potentiometer 4 and the amplifier 8 can be controlled by a potentiometer 5. These potentiometers 4 and 5 permit an accurate adjustment, even though the moment of resistance and thus, the moment of inertia of the deflection beam 3, is subject to deviations due to tolerances. The proportionality factor K of the strain gauges 16 and 17 may be subject to deviations due to tolerances. The proportionality factor K is the ratio between relative longitudinal lengthening and change of resistance of each strain gauge 16 and 17. An incorrect attachment of the strain gauges 16 and 17 to the deflection beam 3, i.e., a change in the spacings 11 and 12 may also be balanced by the potentiometers 4.

The output voltage from the measuring bridge 18 is supplied to a switch 9 via the amplifier 7, and vis the switch 9 to a measured value memory 11 in the form of or provided by a condenser. The output voltage from the measuring bridge 19 is supplied to a switch 10 via the amplifier 8, and via the switch 10 to a measured value memory 12 which is also in the form of or provided by a condenser. The measured values stored in the memories (condensers) 11 and 12 are alternatingly and successively applied to an analog-to-digital converter 13 (AD-converter) by a switch 22. The analog-to-digital converger 13 is connected to a micro-processor 14 which, in turn, is connected to an indicating instrument 15 for digital display of the measured values.

The micro-processor controls the switch 22 and the switches 9 and 10, as well as the amplifiers 7 and 8. The micro-processor 14 further controls two transistors 20 and 21 connected with the two measuring bridges 18 and 19. The transistors 20 and 21 operate to cyclically apply electric current to activate the related bridges for periods of approximately 15 to 200 micro-seconds.

When using the torque wrench as intended, the measurements will be carried out in very short intervals so that power consumption is very low. As the measuring times are quite short, approximately 20 measurements per second can be carried out without requiring substantial power consumption. In use, the cyclic sequence of the measurements can increase upon display of the rapidly changing measured value, controlled by the micro-processor. As soon as the measured values do not change when using the torque wrench, the cyclic sequence will be slowed down substantially so that hardly any power consumption occurs.

The measuring bridges 18 and 19 are only switched on by the transistors 20 and 21 for fractions of the actual measuring cycle and their measured values are stored in their related memories (condensers) 11 and 12. This greatly reduces the power consumption during actual measurement as well as when measurement is interrupted. By storing the measuring voltages measured and amplified in the amplifiers 7 and 8, it is possible to successively process the values obtained during the measurements in the AD-converter 13 and the micro-processor 14. The AD-converter 13 is slow to operate with respect to the operating speed of the measuring bridges 18 and 19. The measuring bridges 18 and 19 need not be switched on during the whole conversion time of the relatively slow AD-converter 13. Since the AD-converter 13 is slow operating, it operates at low power consumption. Further, when measurement is interrupted, the AD-converter 13 can be disconnected from the micro-processor 14. The measuring voltages are stored in the memories or condensers 11 and 12 since the switches 9 and 10 are connected with and controlled by the micro-processor 14. The memories or condensers 11 and 12 are charged during switch-on of the measuring bridges 18 and 19. Prior to switch-off of the measuring bridges 18 and 19, the switches 9 and 10 are opened by the micro-processor. During charging of the condensers 11 and 12, the switch 22 is open. Only during interrogation of the stored measured values in the memories 11 and 12 is the switch 22 in one or the other of its two closed switching positions and then establishes only a temporary connection to the AD-converter 13. To further save electric current, the amplifiers 7 and 8, controlled by the micro-processor, are disconnected or turned off between the measuring cycles.

Advantageously, during a zero torque measurement, the two measuring bridges 18 and 19 may have an output voltage applied thereto, corresponding to approximately half the maximum voltage to be processed by the AD-converter 13. During a torque measurement in one direction of rotation of the wrench, the voltage values cover the range between say ½ and 1/1, while during a torque measurement in the other direction of rotation of the wrench, the voltage values cover the range between ½ and 0. This provides a simple means of indicating positive and negative torques, i.e., torques in the one or the other direction of rotation. The maximum voltage to be processed by the AD-converter 13 is about 2.5 volts. During a measurement of torque of zero order, the AD-converter 13 is supplied with an output voltage of approximately 1.25 volts from the measuring bridges 18 and 19.

During a zero torque measurement, the acutal value of the output voltage of the measuring bridges 18 and 19 can be compared with the nominal value and deviations during actual measurement of positive or negative torques are used as correction values in the microprocessor. Changes in length of the strain gauges 16 and 17, due to thermal expansion and contraction, are therefore balanced automatically in a simple manner.

The measured values of series of measurements can be interconnected and/or compared in the microprocessor 14 so that the mean value and/or the maximum value of a series of measurements can be displayed upon interrogation.

It is also possible to optically and/or acoustically indicate when a predetermined torque to be applied is reached or exceeded, within a desired range of tolerances (plus or minus). The user is thereby informed optically and/or acoustically that the adjusted tolerance range is reached. As soon as the lower limit is reached, a green lamp, not shown here, for instance, lights up. If the tolerance range is exceeded, a red lamp, also not shown here, may light up. When passing through the tolerance range, an acoustic signal may also be supplied. Prior to use of the torque wrench, the user may feed in the tolerance range of the nominal value with respect to the upper and lower limits differently in percents.

When exceeding the maximum value of the torque to be applied, by reverse rotation of the wrench, the inadmissibly high measured value can be removed from the measured value interconnection for determination of the maximum value and/or mean value of a series of measurements. When the user has applied an inadmissibly high torque to a screw fastener with the torque wrench, he must release the screw fastener again by reverse rotation. By this reverse rotation, the inadmissibly high measured value is removed from the measured value interconnection so that it does not have any influence on the determination of the mean value of a series of measurements. Of course, it is also possible to interconnect in the micro-processor 14 only such actual values which are within the tolerance range. All other values, such as those associated with the opposite direction of rotation of the wrench, will not be processed.

The micro-processor 14 may be used to change the voltage supplied to the measuring bridges 18 and 19 and hence, the measuring range. A change in the measuring range may also be achieved by changing the amplification of the output voltages of the measuring bridges 18 and 19, as controlled by the micro-processor. The micro-processor 14 may also be used to simultaneously carry out a conversion and change over to different units of measure. As units of measure, for instance, meterkilogram and Newtonmeter can be used. Also, a conversion to the English system of measures is possible.

Having described only one typical preferred form and embodiment of my invention, I do not wish to be limited to the details set forth above, but wish to reserve to myself any modifications and/or variations which might appear to those skilled in the art and which fall within the scope of the following claims:

Having described my invention, I claim:

1. A torgue wrench for measuring the application of bias forces to the shafts of necked-down screws in work pieces comprising an elongate deflection beam with a point of engagement for a screw head at one end and a handle at the other end, said beam bends elastically when used as intended, two spaced apart strain gauges positioned longitudinally of the beam, each gauge is connected in a related measuring bridge, an amplifier receives and amplifies the voltage output of each bridge, a voltge value memory means receives and stores the values of each amplified voltage, switch means cyclically and alternately direct the stored voltage values from the memory means to a common analogue to digital converter, the converter cyclically and alternately conducts the converted digital voltage values to a micro-processor that compares the voltage values and conducts a resulting signal to an indicating instrument.

2. The torque wrench set forth in claim 1 which further includes a transistor connected with each bridge and which is connected with and controlled by the micro-processor and which cyclically conducts current to and energizes its related bridge.

3. The torque wrench set forth in claim 2 wherein the cyclical rate of the micro-processor to compare voltage values and to control the transistors varies as the rate of change of compared voltges increases and decreases.

4. A torque wrench as claimed in claim 3 wherein zero torque measurements of the two measuring bridges have output voltages corresponding to half of the maximum voltage processed by the analog-to-digital converter and upon torque measurement in one direction of rotation cover voltage values between $\frac{1}{2}$ and 1/1 and upon torque measurement in the other direction of rotation cover the voltage values between $\frac{1}{2}$ and 0.

5. A torque wrench as claimed in claim 4 wherein the maximum voltage being processed by the analog-to-digital converter is approximately 2.5 volts.

6. A torque wrench as claimed in claim 5 wherein the zero torque measurement as the actual value of the output voltage of the measuring bridges is compared with the nominal value and deviations of output voltage of the measuring bridges during the actual measurement of positive or negative torques, said actual value is used as a correction value in the micro-processor.

7. A torque wrench as claimed in claim 6 wherein measured values of series of measurements are interconnected in the micro-processor and the mean value of the series of measurements are displayed upon interrogation.

8. A torque wrench as claimed in claim 6 wherein the measured values of series of measurements are interconnectable in the micro-processor and the maximum value of the series of measurements are displayed upon interrogation.

9. A torque wrench with an elongate deflection beam, a pair of independent strain gauges attached to a side of the beam which is stretched and compressed during normal use of the wrench, the strain gauges are spaced longitudinally of the beam and relative to each other, each strain gauge is a resistor connected in a related measuring bridge, the output of each bridge is conducted to an amplifier, the amplified voltage of each amplifier is conducted through a related switch and stored in a related measured voltage value memory, the stored voltages in the two memories are conducted to a switching means and cyclically and alternatingly conducted to an analog-to-digital converter and thence from the analog-to-digital converter to a micro-processor which compares the voltages and conducts a signal to an indicating instrument.

10. The torque wrench set forth in claim 9 wherein the two bridges are cyclically energized for periods of 15 to 200 micro-seconds by current from transistors which are connected with and controlled by the microprocessor.

11. The torque wrench set forth in claim 10 which further includes variable potentiometers connected with the amplifiers and operate to adjust amplification of the voltages delivered thereby.

12. The torque wrench set forth in claim 11 wherein the switch related to each related amplifier and measured voltage value memory is connected with the micro-processor and is controlled thereto to cyclically open and close.

13. The torque wrench set forth in claim 12 wherein the measured voltage value memories are condensers connected with lines connecting said related switches and said switching means.

14. The torque wrench set forth in claim 13 wherein the switching means is connected with and controlled by the micro-processor to cyclically and alternatingly close circuits between each of the measured voltage value memory condensers and the analog-to-digital converter.

15. The torque wrench set forth in claim 13 wherein the indicating instrument is an electric digital display unit and displays digits representing units of force represented by the value of the output signal of the microprocessor.

16. The torque wrench set forth in claim 9 wherein the switch related to each related amplifier and measured voltage value memory is connected with the micro-processor and is controlled thereby to cyclically open and close.

17. The torque wrench set forth in claim 9 wherein the switching means is connected with and controlled by the microprocessor to cyclically and alternatingly close circuits between each of the measured voltage value memory condensers and the analog-to-digital converter.

18. The torque wrench set forth in claim 9 wherein said measuring bridge amplifier switches and switching means are connected with and controlled by the microprocessor to operate cyclically.

19. The torque wrench set forth in claim 9 wherein the two measuring bridges and their related amplifiers and switches and the common switching means related thereto are connected with and controlled by the micro-processor whereby the measuring bridges and their related amplifiers and switches operate cyclically and alternatingly and said switching means operate cyclically to alternatingly conduct the measured value voltages from the measuring bridges to the analog-to-digital converter.

* * * * *